Dec. 27, 1932.    I. WOLFF    1,892,646

SYSTEM RESPONSIVE TO THE ENERGY DENSITY OF SOUND WAVES

Filed May 29, 1931

INVENTOR
IRVING WOLFF
BY  H. S. Grover
ATTORNEY

Patented Dec. 27, 1932

1,892,646

UNITED STATES PATENT OFFICE

IRVING WOLFF, OF NEW YORK, N. Y., ASSIGNOR TO RADIO CORPORATION OF AMERICA, A CORPORATION OF DELAWARE

SYSTEM RESPONSIVE TO THE ENERGY DENSITY OF SOUND WAVES

Application filed May 29, 1931. Serial No. 540,898.

This invention relates to a system and apparatus responsive to the energy of a sound wave at any given point. The system may be used to measure the energy of the sound wave. More particularly the invention relates to a system and apparatus for measuring the density of the energy of a sound wave. The energy measuring system consists of a number of microphones, at least one of which is responsive to the pressure component of the sound wave and others of which are responsive to the velocity component of the sound wave, and means for combining the outputs of the microphones in a manner such that the total energy density of the sound wave can be determined. A copending application Serial Number 541,095 filed concurrently herewith in the name of Harry F. Olson, describes a system responsive to the energy flow of sound waves.

The object of the invention is to provide efficient and relatively simple apparatus for measuring the energy density of a sound wave at any given point, such as, for example, at various locations in a theatre or auditorium. By means of the present invention the energy density of the output of different types of sound reproducers can be readily compared. Furthermore, the system can be used to determine the energy density of a sound wave at different points in the vicinity of and remote from the source of sound. Further objects of the invention will become apparent on reading the following specification and the appended claims.

The energy of a sound wave is made up partly of potential energy and partly of kinetic energy. The potential energy is due to the condensations and rarefactions in the air. At certain regions in a sound wave, the air is at a pressure either above or below atmospheric pressure and in returning to normal atmospheric equilibrium the air particles can do work. The kinetic energy in the sound wave is due to the motion of the air particles.

Various types of apparatus such as different kinds of microphones, have been used either to determine the pressure component of a sound wave which is a measure of the potential energy, or to determine the oscillatory velocity component which is a measure of the kinetic energy. In a plane, progressive sound wave the amplitude of the pressure or velocity is the same at all points in space, and the energy is uniformly distributed between the component due to pressure and the component due to velocity. Either one of these quantities may therefore be used as a measure of the energy density of sound in the wave. But in complex sound waves such as when sound waves are reflected from walls, interference patterns are set up in which there are certain concentrations of pressure and velocity, i. e., pressure and velocity nodes. The pressure and velocity concentration make either one of the quantities unsuitable for determining the energy density at any particular point in space. It is therefore necessary to determine each quantity separately and then add them in the proper manner.

The pressure quantity, i. e., the energy density of the pressure component of the sound wave, can be most suitably determined by means of a microphone such as a condenser microphone. A microphone of this type measures essentially the difference between the pressure due to the sound wave and the atmospheric pressure. The microphone should be small enough so that only small changes will be made in the sound field due to the presence of the microphone in the field.

The velocity of motion of the particles in a sound wave is a vector quantity. It is made up by adding vectorially the velocities due to all the sound waves which pass through a single point in space at a given instant. In general these velocities, due to differences in phase and direction, will not add to give a simple vector having a specified direction in space, but will determine some kind of rotating vector. However, a satisfactory way to measure the energy in the velocity component of a sound wave, is to take the components of this vector in three mutually perpendicular axes. This can be done by having three velocity responsive microphones set at right angles to each other. The microphones should all be sufficiently small compared to the wave length of the sound wave so that they will not materially distort the sound field.

The kinetic and potential energies obtained from the velocity responsive and pressure responsive microphones respectively, can be added directly by passing the separately amplified outputs of the microphones through separate energy measuring devices, such as thermo-couples, whose output currents can be added on a single meter. It is important to note that the outputs from the four microphone elements can not be added until the energy of each has been determined separately. This is due to the fact that the output currents from the microphones might be of such phase with respect to each other that they would be cancelled out if added linearly.

For a more complete understanding of the invention, reference can be made to the accompanying drawing, in which Fig. 1 illustrates diagrammatically an approved arrangement of pressure responsive and velocity responsive microphones;

Fig. 2 illusrates in more detail the structure of one of the velocity responsive microphones;

Figure 1:
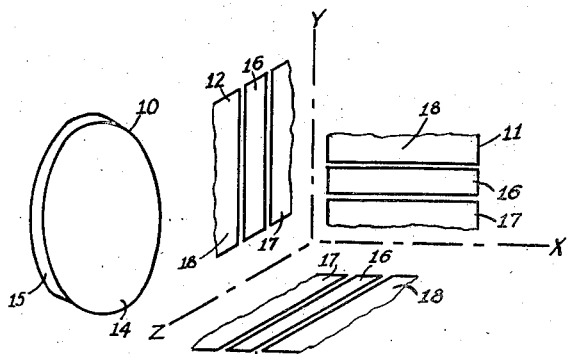

Referring more particularly to the drawing:

In Fig. 1 there is shown diagrammatically, a microphone 10 of the type which is responsive to the pressure component of a sound wave, and three microphones 11, 12 and 13 of the type which is responsive to the velocity component of a sound wave. The microphone 10 is of the condenser type. It consists of two condenser elements or plates 14 and 15. One of these plates is normally a fixed plate and the other is a diaphragm which is adapted to be vibrated by the pressure component of a sound wave. The velocity responsive microphones 11, 12 and 13 are shown in more detail in Fig. 2. They are preferably arranged, as shown in Fig. 1, so that microphone 11 is in the plane XY, microphone 12 is in the plane YZ, and microphone 13 is in the plane ZX. Each of these planes is at right angles to the other two planes. The plane of the microphone 10 may be parallel with any of the planes XY, YZ or ZX, or it may be at an angle to these planes. Good results are obtained when the plane of the microphone 10 is arranged to form equal angles with each of the planes of the microphones 11, 12 and 13. All of the microphones are made sufficiently small so that they will not materially distort the sound field.

Figure 2:
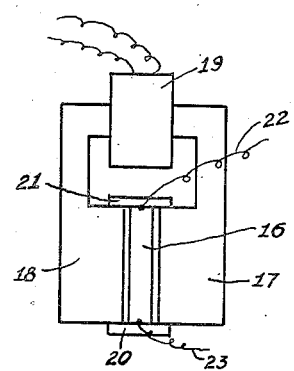

The velocity responsive type of microphone is described in detail in a copending application S. N. 526,598 filed March 31st 1931 in the name of Harry F. Olson. As shown in Fig. 2, it consists primarily of a thin, flexible, ribbon-like member 16 located in a magnetic field formed by two pole pieces 17 and 18. The pole pieces 17 and 18 are preferably energized by a winding 19 provided with a uni-directional current in any well known manner. The ends of the ribbon 16 are supported by suitable supporting members 20 and 21. Leads 22 and 23 are connected with the ends of the ribbon. If the ribbon 16 and the pole pieces 17 and 18 are made sufficiently small, the microphone will be responsive to the velocity component of the sound wave. Vibration of the ribbon 16 in the magnetic field sets up an E. M. F. in the ribbon which may be applied to an amplifier or any other device by means of the leads 22 and 23. For a more complete understanding of the velocity responsive or ribbon type microphone reference may be made to the aforementioned application, S. N. 526,598.

Figure 3:
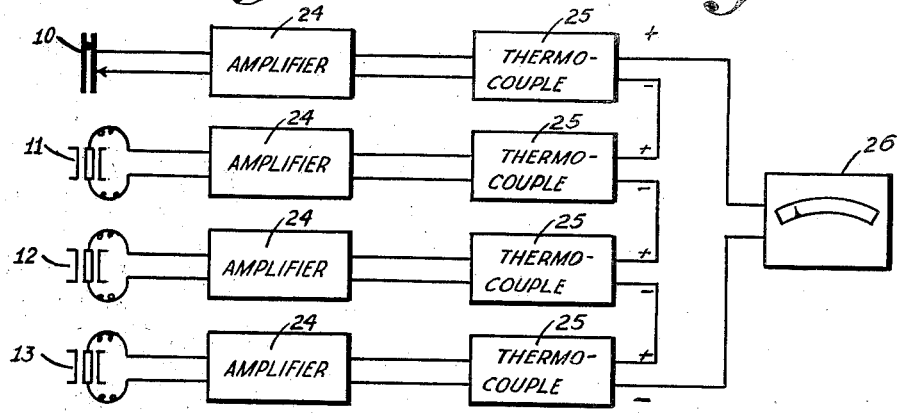
Fig. 3 illustrates diagrammatically the complete system including the means for amplifying, measuring and combining the energies from the microphones.

Fig. 3 illustrates diagrammatically one of the possible methods of connecting the microphones with the necessary amplifying, measuring and indicating devices. In this system the pressure responsive microphone 10 is connected directly to an amplifier 24 of any well known type. The output of the amplifier 24 is connected to a suitable energy measuring device 25. The velocity responsive microphones 11, 12 and 13 are also connected through separate amplifiers 24 to similar measuring devices 25. Outputs from the measuring devices 25 are connected in series and a suitable indicating device 26 such as an ammeter or galvanometer is also connected in the series circuit. The possibility of having the energy from one microphone cancel the energy from another microphone due to phase differences is avoided by first measuring the energy from each microphone in a separate energy measuring device and then combining the measured energies.

Figures 4, 5:
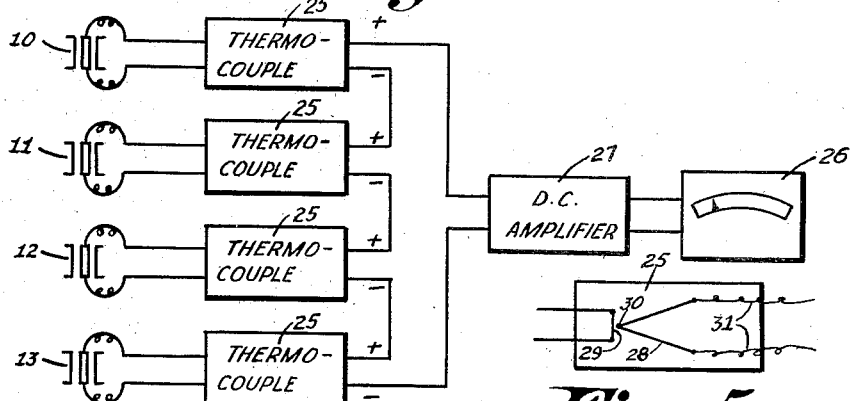
Fig. 4 illustrates a modification of the system illustrated in Fig. 3.
Fig. 5 illustrates diagrammatically an approved form of the energy measuring device shown in Figs. 3 and 4.

Fig. 4 shows another system for measuring and combining the energies from the separate microphones. In this system the energy from each microphone is measured in a separate energy measuring device 25 without first being amplified. The outputs of the energy measuring devices are connected in series and the combined output is then amplified in a suitable amplifier 27 before being supplied to the indicating device 26. In some instances it may even be convenient to eliminate all amplifiers. In other instances it may be found desirable to have separate amplifiers before each energy measuring device and a common amplifier for the combined outputs.

As shown in Fig. 5, the energy measuring device 25 may consist of a thermo-couple 28 and a heater resistance 29 located adjacent the junction 30 of the thermo-couple. With this type of measuring device the output from the amplifier or from the microphone is connected directly to the heater resistance 29. Leads 31 are provided at the free ends of the thermo-couple elements to connect the energy measuring device with a suitable ammeter or galvanometer. Apparatus of this general nature is known as a thermo-ammeter or as a thermo-galvanometer.

The apparatus has been described for practical purposes, as an energy measuring device. It is to be understood, however, that the system has many other uses which come within the scope of my invention. For example, the system may be located at some desired point in a theatre or auditorium and the energy output of the system used to control the volume of sound in the enclosure. The system may also be used to detect sound in a range finding device, and for many other purposes.

While I have shown and explained an approved form of my invention it is to be understood that various modifications can be made to the system illustrated without departing from the spirit of the invention. For example, other types of pressure responsive devices, such as a carbon microphone, may be substituted for the condenser microphone 10. Furthermore, a single velocity responsive microphone such as a hot wire microphone, may be substituted for the three microphones, 11, 12 and 13, or for any one of them. It may also be convenient to use some other type of energy measuring device in place of the thermo-couple and heater resistance which I have described. In view of these and various other modifications which may readily suggest themselves to one skilled in the art, it is my desire to be limited only by the scope of the appended claims.

What I claim is:

1. The method of measuring the energy of a sound wave comprising the steps of (1) measuring separately the energy of different components of the sound wave, (2) combining the measured energies, and (3) indicating the total energy of the sound wave from the combined energies.

2. The method of measuring the energy of a sound wave comprising the steps of (1) converting separately energy of different components of the sound wave into electrical variations, (2) measuring separately the energy of the electrical variations from each component, (3) combining the measured quantities, and (4) indicating the total energy of the sound wave from the combined quantities.

3. The method of measuring the energy density of a sound wave comprising the steps of (1) measuring the energy density of the pressure component of the sound wave, (2) measuring the energy density of the velocity component of the sound wave, (3) combining the measured quantities, and (4) indicating the total energy of the sound wave from the combined quantities.

4. The method of measuring the energy density of a sound wave comprising the steps of (1) converting energy of the pressure component of the sound wave into electrical variations, (2) converting energy of the velocity component of the sound wave into electrical variations, (3) measuring separately the energy of the electrical variations from the pressure component and from the velocity component, (4) combining the measured quantities, and (5) indicating the total energy density from the combined quantities.

5. Apparatus responsive to the energy of a sound wave comprising means responsive separately to different energy components of the sound wave, each of said means being responsive over substantially the same frequency range, and means for combining the outputs due to the separate components.

6. Apparatus for measuring the energy of a sound wave comprising means for measuring separately the energy of different components of the sound wave, and means for combining the measured energies and indicating the total energy of the sound wave.

7. Apparatus responsive to the energy density of a sound wave at any point remote from the source of sound, comprising means responsive separately to the energy density of different components of the sound wave at said point, means for combining the outputs of the first mentioned means.

8. Apparatus responsive to the energy density of a sound wave, comprising means responsive separately to the energy density of different components of the sound wave, separate means actuated by the energy output of each of the first mentioned means, and a single means for utilizing the total energy density of the sound wave, said single means being actuated by the combined energies from said separate means.

9. Apparatus for measuring the energy of a sound wave comprising means for measuring the energy of the pressure component of the sound wave, means for measuring the energy of the velocity component of the sound wave, and means for combining the measured energies and indicating the total energy due to the pressure and velocity components of the sound wave.

10. Apparatus for measuring the energy density of a sound wave at any point remote from the source of sound, comprising means for measuring the energy density of the pressure component of the sound wave at said point, means for measuring the energy density of the velocity component of the sound wave at said point, and means for combining the outputs of the energy measuring means and indicating the total energy of the sound wave at said point.

11. Apparatus responsive to the energy density of a sound wave comprising means responsive to the energy density of the pressure component of a sound wave, means responsive to the energy density of the velocity component of the sound wave, separate means actuated by the energy output of each of the aforementioned means, and a single means actuated by the combined energies from said separate means for utilizing the total energy density of the sound wave.

12. A system responsive to the energy density of a sound wave, comprising means responsive to the energy density of the pressure component of the sound wave, additional means responsive to the energy density of the velocity component of the sound wave at the same time and at the same point, a separate device actuated by the output of each of said means, each of said devices including a thermo-couple and a heater element, a circuit connecting the outputs of said thermo-couples in series, and apparatus actuated by the energy in said circuit.

13. A system responsive to the energy density of a sound wave, comprising means for converting energy of the pressure component of the sound wave into electrical variations, additional means for converting energy of the velocity component of the sound wave into electrical variations, a separate device actuated by the energy of the electrical variations from each of said means, each of said devices including a thermo-couple and a heater resistance energized by said electrical variations, said heater resistance being located adjacent the junction of said thermo-couple, a circuit for connecting the outputs of said thermo-couples in series, and additional apparatus adapted to be actuated from the currents in said circuit.

14. Apparatus responsive to the energy of a sound wave comprising a microphone system responsive to the pressure component of the sound wave, a microphone system responsive to the velocity component of the sound wave, separate means responsive to the energy output from each microphone, and means for combining and utilizing the outputs from each of said separate means.

15. Apparatus for measuring the energy density of a sound wave comprising a microphone responsive to the pressure component of the sound wave, a microphone system responsive to the velocity component of the sound wave, separate means for measuring the energy output from each microphone, and means for combining the measured energies and indicating the total energy density of the sound wave.

16. Apparatus for measuring the energy density of a sound wave comprising a microphone responsive to the pressure component of the sound wave, a plurality of microphones responsive to the velocity component of the sound wave, separate means for measuring the energy output from each microphone, means for adding the measured quantities, and means for indicating the total energy density of the sound wave.

17. Apparatus for measuring the energy density of a sound wave comprising a pressure responsive microphone, three velocity responsive microphones arranged in planes at right angles to each other, apparatus for measuring separately the outputs of each of said microphones, and means for combining the measured energies and indicating the total energy.

18. Apparatus for measuring the energy density in a sound wave comprising a pressure responsive microphone, three velocity responsive microphones arranged at right angles to each other, a separate thermo-couple device for determining the outputs of each of said microphones, an electrical indicator, and a circuit connecting the outputs of said thermo-couple devices and said indicator in series.

19. A system for measuring the energy of a sound wave comprising a condenser microphone, three ribbon microphones arranged in planes at right angles to each other, an amplifier for each microphone, an energy measuring device for each microphone, each of said energy measuring devices including a thermo-couple and a heater resistance located adjacent the junction of said thermo-couple, a circuit connecting the outputs of said thermo-couples in series, and an indicating device connected in said circuit.

20. Apparatus responsive to the energy of a sound wave comprising means responsive separately to the velocity and pressure components of the sound wave, each of said means being responsive over substantially the same frequency range, and means for combining the outputs due to the velocity and pressure components.

IRVING WOLFF.